United States Patent
Lee et al.

(10) Patent No.: US 9,280,713 B2
(45) Date of Patent: Mar. 8, 2016

(54) APPARATUS AND METHOD FOR PROCESSING IMAGE MOUNTED IN VEHICLE

(71) Applicant: Hyundai Motor Company, Seoul (KR)

(72) Inventors: Won Seok Lee, Seongnam-si (KR); Ha Yong Woo, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/301,095

(22) Filed: Jun. 10, 2014

(65) Prior Publication Data

US 2015/0169965 A1   Jun. 18, 2015

(30) Foreign Application Priority Data

Dec. 17, 2013   (KR) .......................... 10-2013-0157422

(51) Int. Cl.
*G06K 9/00* (2006.01)
(52) U.S. Cl.
CPC ........ *G06K 9/00825* (2013.01); *G06K 9/00791* (2013.01); *G06K 9/00805* (2013.01)
(58) Field of Classification Search
CPC .......... G06K 9/00805; G06K 9/00798; G06K 9/342; G06K 9/00825
See application file for complete search history.

(56) References Cited

U.S. PATENT DOCUMENTS

| | | | |
|---|---|---|---|
| 2003/0160153 A1* | 8/2003 | Hara et al. | 250/214 VT |
| 2008/0180528 A1* | 7/2008 | Saito | G06K 9/00825 348/148 |
| 2008/0192984 A1* | 8/2008 | Higuchi et al. | 382/104 |
| 2009/0021581 A1* | 1/2009 | Sun et al. | 348/148 |
| 2010/0079612 A1 | 4/2010 | Kimura | |
| 2013/0188051 A1* | 7/2013 | Ishigaki | G06K 9/00825 348/148 |
| 2014/0009617 A1* | 1/2014 | Utagawa et al. | 348/148 |

FOREIGN PATENT DOCUMENTS

| | | | |
|---|---|---|---|
| JP | 11-203446 A | | 7/1999 |
| JP | 2007-193702 A | | 8/2007 |
| JP | 2007193702 A | * | 8/2007 |
| JP | 2010-073009 A | | 4/2010 |
| KR | 2004-0107644 A | | 12/2004 |
| KR | 2011-0062057 A | | 6/2011 |
| KR | 2012-0072141 A | | 7/2012 |

OTHER PUBLICATIONS

Andrade, Luiz C. G., et al.: "A Video-Based Support System for Nighttime Navigation in Semi-Structured Environments", Proceedings of the XVII Brazilian Symposium on Computer Graphics and Image Processing (SIBGRAPI'04) IEEE, 2004, 8 pages.

* cited by examiner

*Primary Examiner* — Stephen R Koziol
*Assistant Examiner* — Jonathan S Lee
(74) *Attorney, Agent, or Firm* — McDermott Will & Emery LLP

(57) ABSTRACT

An apparatus and a method for processing an image mounted in a vehicle include a camera mounted in the vehicle to acquire image data around the vehicle. A controller is configured to analyze the image data to extract at least one light region having an elliptical shape or a closed surface shape formed of a free curve, separates the light region into a point source and reflected light, and then corrects and outputs the image data of a location at which the reflected light is confirmed.

9 Claims, 3 Drawing Sheets

APPARATUS AND METHOD FOR PROCESSING IMAGE MOUNTED IN VEHICLE

CROSS-REFERENCE TO RELATED APPLICATION

This application is based on and claims the benefit of priority to Korean Patent Application No. 10-2013-0157422, filed on Dec. 17, 2013 in the Korean Intellectual Property Office, the disclosure of which is incorporated herein in its entirety by reference.

TECHNICAL FIELD

The present disclosure relates to an apparatus and a method for processing an image mounted in a vehicle, and more particularly, to an apparatus and a method for processing an image mounted in a vehicle capable of removing reflected light, which is generated by reflecting the light from a headlight and a taillight of another vehicle from a road surface, from image data around the vehicle.

BACKGROUND

Generally, when a driver drives a vehicle at night or in rainy weather, light from headlights of the vehicle located at the front and back of the vehicle is reflected from a road surface, and thus dazzling the driver and degrading driver performance.

A technology of controlling brightness of a display of a monitoring system for a vehicle to prevent dazzling has been used. However, since brightness of a headlight itself is also reduced, it is difficult to recognize surrounding vehicles and ensure a driver's front field of vision at night or in rainy weather, such that a vehicle collision may occur.

SUMMARY

The present disclosure has been made to solve the above-mentioned problems occurring in the prior art while advantages achieved by the prior art are maintained intact.

An aspect of the present disclosure provides an apparatus and a method for processing an image mounted in a vehicle capable of extracting reflected light generated due to light from a headlight and a taillight of another vehicle from acquired image data around the vehicle and removing the reflected light from the image data by processing an image of a region corresponding to a location of the extracted reflected light.

According to an exemplary embodiment of the present disclosure, an apparatus for processing an image mounted in a vehicle includes a camera mounted in the vehicle to acquire image data around the vehicle. A controller is configured to analyze the image data to extract at least one light region having an elliptical shape or a closed surface shape formed of a free curve, separates the light region into a point source and reflected light, and then corrects and outputs the image data of a location at which the reflected light is confirmed.

The apparatus for processing the image mounted in the vehicle may further include a storage configured to store elliptical data or closed surface data for separating the reflected light.

The controller may compare the stored elliptical data or closed surface data with the light region to separate the light region having a size larger than that of the elliptical data or the closed surface data into the reflected light.

The controller may recognize the light region as the reflected light when a ratio between lengths of a major axis and a minor axis of the separated reflected light is equal to or more than a threshold value or the length of the major axis is equal to or more than a threshold length.

The controller may remove the reflected light from the image data and correct brightness of a region, from which the reflected light is removed, to be the same as that of a road surface confirmed by the image data.

The point source may be a light source region including a headlight and a taillight of another vehicle.

The reflected light may be a road surface reflecting region in which light generated from the light source including a headlight and a taillight of another vehicle is reflected from the road surface.

According to another exemplary embodiment of the present disclosure, a method for processing an image includes acquiring, by a controller, image data around a vehicle from a camera. The acquired image data is analyzed to extract at least one light region having an elliptical shape or having a closed surface shape formed of a free curve. The light region is separated into a point source and reflected light. The image data of a location is corrected at which the separated reflected light is confirmed; and outputting the corrected image data.

In the step of separating the light region into the point source and the reflected light, the light region may compare with a pre-stored elliptical data or closed surface data to separate the light region having a size larger than that of the elliptical data or the closed surface data into the reflected light and separate another light region into the point source.

The method for processing an image may further include confirming a ratio between lengths of a major axis and a minor axis of the separated reflected light after the separating of the light region into the point source and the reflected light. The light region is recognized as the reflected light when the ratio between the lengths is equal to or more than a threshold value or when the length of the major axis is equal to or more than a threshold length.

The step of correcting the image data may include deleting the separated reflected light from the image data. Brightness of a road surface is confirmed from the image data. Brightness of the region is corrected, from which the reflected light is deleted, to be the same as that of the road surface.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in more detail with reference to the accompanying drawings. However, in describing embodiments of the present disclosure, technical descriptions which are well known and are not directly associated with the present disclosure will be omitted if possible. This is to more clearly deliver the gist of the present disclosure so as not to obscure the description of the present disclosure with unnecessary detail.

Figure 1:
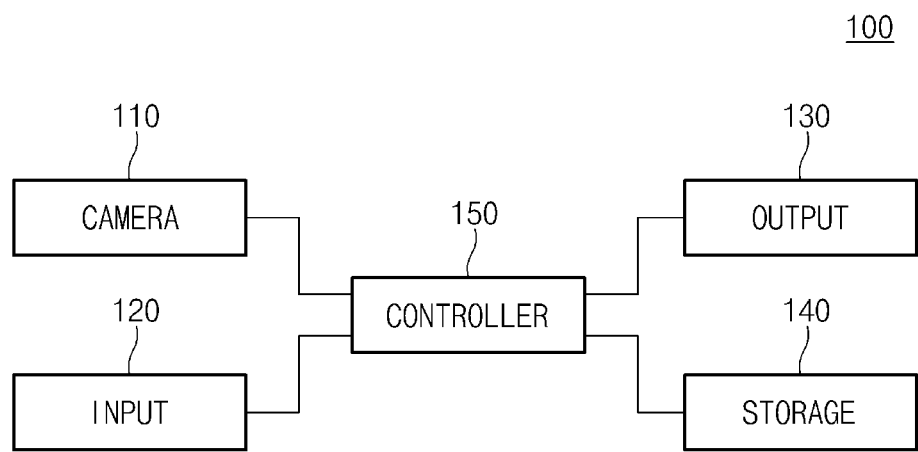
FIG. 1 is a block diagram illustrating main components of an apparatus for processing an image mounted in a vehicle according to an exemplary embodiment of the present disclosure.

FIG. 1 is a block diagram illustrating main components of an apparatus for processing an image mounted in a vehicle according to an exemplary embodiment of the present disclosure. In this case, the apparatus for processing an image may be an audio, video, and navigation (AVN) system which is mounted in a vehicle.

Referring to FIG. 1, a device 100 of processing an image according to an exemplary embodiment of the present disclosure may include a camera 110, an input 120, an output 130, a storage 140, and a controller 150.

The camera 110 is mounted in the vehicle to acquire image data outside the vehicle depending on a control of the controller 150. The camera 110 may be mounted in the back and front of the vehicle.

The input 120 generates an input signal depending on an input from the outside and provides the generated input signal to the controller 150. The input 120 removes reflected light from the image data around the vehicle depending on the input of a driver to be able to generate the input signal for entering an image processing mode for improving driver's visibility. To this end, the input 120 may be a keypad, a touch pad, a touch screen, and the like. When the input 120 is the touch screen, the input 120 may simultaneously perform a function of the output 130.

The output 130 outputs a display which corresponds to an operation generated inside the apparatus 100 for processing the image. In particular, the output 130 may output the image data from which the reflected light generated by reflecting light from a headlight or a taillight of another vehicle from a road surface from the image data acquired by the camera 110 depending on the control of the controller 150 is removed. To this end, the output 130 may be a liquid crystal display (LCD), and the like. When the output 130 is the touch screen, it may simultaneously perform a function of the input 120.

The storage 140 stores various kinds of programs for running operations inside the apparatus 100 for processing the image. In particular, the storage 140 may store elliptical data or closed surface data (hereinafter, collectively referred to as elliptical data) formed of a free curve for separating the reflected light from the image data acquired by the camera 110. In this case, the reflected light is observed by reflecting light from a point source including the headlight, the taillight, or the like of the other vehicle from the road surface, a wall surface, or the like and is generally generated as light (hereinafter, collectively referred to as elliptical light) having an elliptical shape or having a closed surface shape formed of the free curve. Therefore, the elliptical data may be formed from the observed light having the elliptical shape.

The controller 150 analyzes the image data acquired by the camera 110 to extract at least one light region having a circular shape and separate the extracted light region into the point source and the reflected light. Further, the controller 150 corrects and outputs the image data of a location at which the reflected light is confirmed.

In more detail, the controller 150 controls the camera 110 to acquire the image data around the vehicle and analyzes the acquired image data to extract the light region. The controller 150 converts brightness values of pixels included in the image data into a binary notation of 0 and 1 and performs clustering processing on the pixels having value 1 to extract the light region from the image data. The controller 150 extracts the light region from the analyzed image data. In this case, the point source may be the region of the headlight or the taillight, and the reflected light may be the region in which light from the headlight or the taillight of the other vehicle is reflected from the road surface.

The controller 150 compares the extracted light region with pre-stored elliptical data in the storage 140 to confirm whether the light region having a size larger than that of the elliptical data exists. When the size of the extracted light region is larger than that of the elliptical data, the controller 150 classifies the light region as a candidate of the reflected light. To the contrary, when the size of the light region is smaller than the elliptical data, the controller 150 recognizes that the reflected light does not exist in the image data and outputs the image data through the output 130.

Further, the controller 150 calculates lengths of a major axis and a minor axis of the light region classified as the candidate of the reflected light and calculates a ratio between the calculated lengths of the major axis and the minor axis. As the calculation result, when the ratio between the lengths of the major axis and the minor axis is equal to or more than a threshold value, the controller 150 recognizes the light region as the reflected light.

When the ratio between the lengths of the major axis and the minor axis is less than the threshold value, the controller 150 confirms the length of the major axis of the light region. As the confirmed result, when the length of the major axis is equal to or more than a threshold length, the controller 150 recognizes the light region as the reflected light.

The controller 150 recognizing the light region as the reflected light confirms the brightness of the road surface from the acquired image data and compares the confirmed brightness of the road surface with the brightness of the light region recognized as the reflected light. The controller 150 removes the reflected light from the image data and recovers the image data of the region from which the reflected light is removed. In this case, the controller 150 may recover the image data so that the brightness of the region in which the reflected light exists is similar to that of the road surface. When the recovery of the image data is completed, the controller 150 outputs the recovered image data through the output 130.

Figure 2:
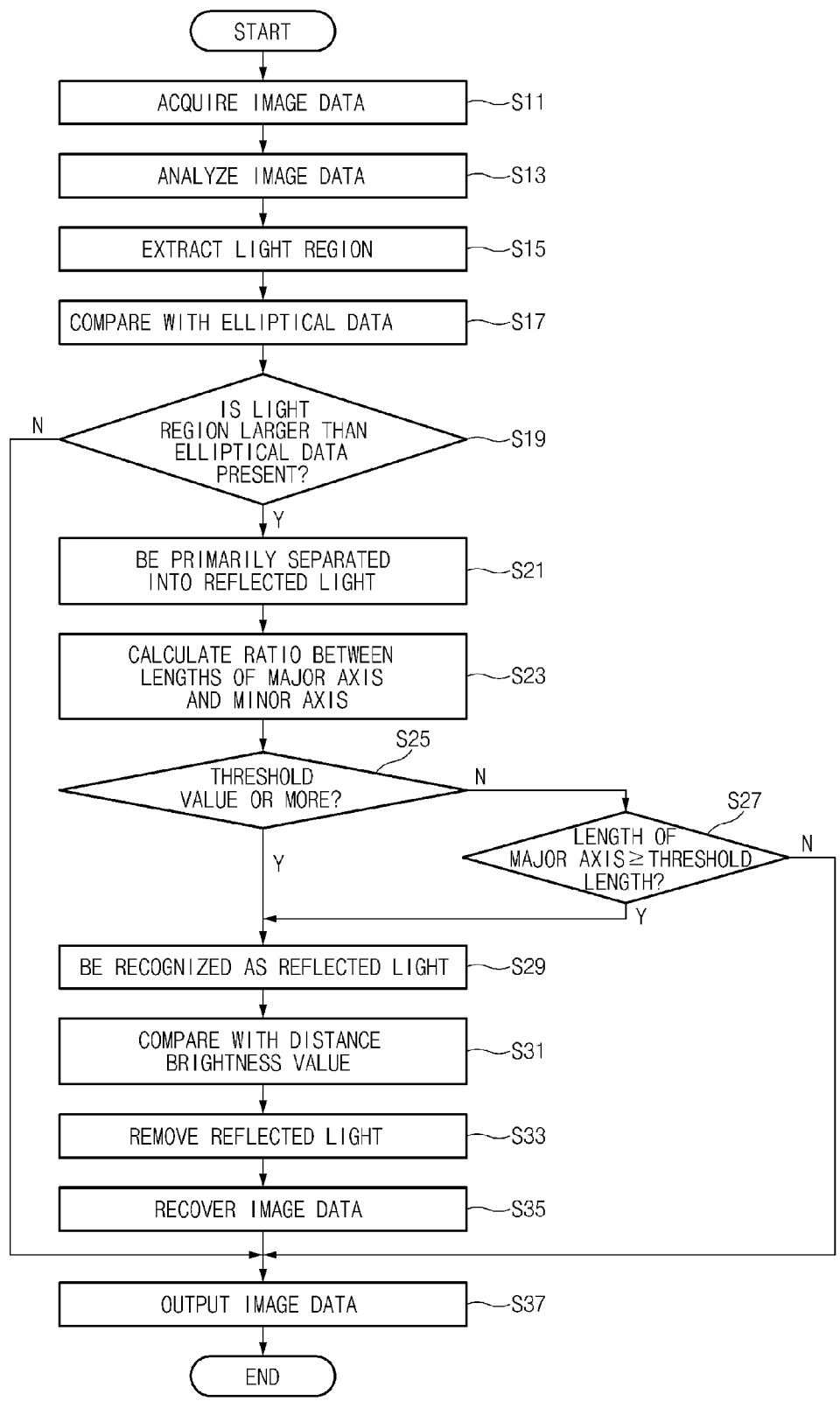
FIG. 2 is a flow chart for describing a method for processing an image using the apparatus for processing an image mounted in a vehicle according to an exemplary embodiment of the present disclosure.
Figure 3:
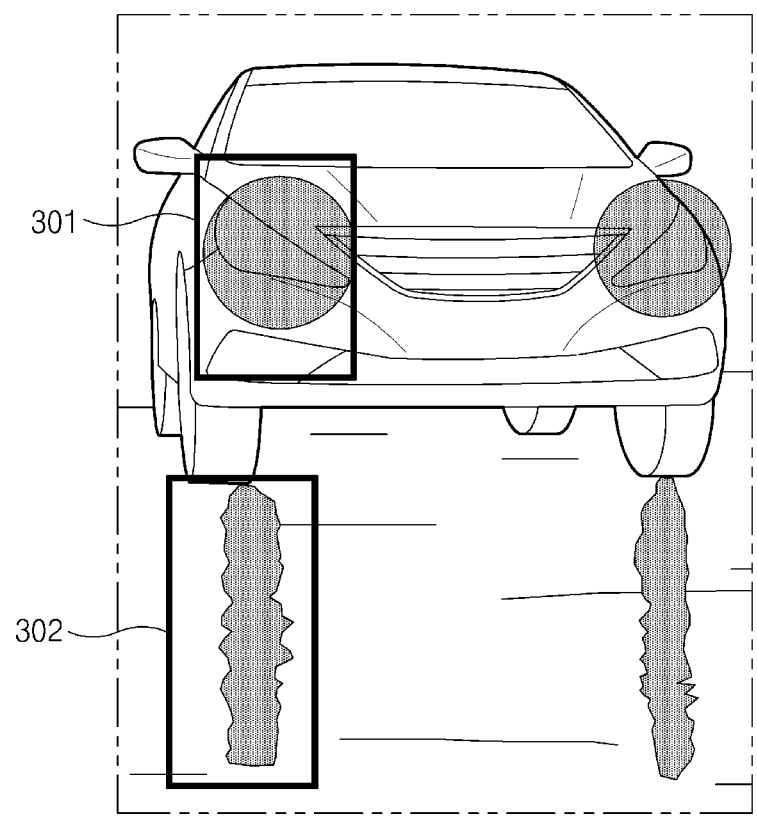
FIG. 3 is an exemplified diagram of a display for describing an extraction of an image processing region according to an exemplary embodiment of the present disclosure.

FIG. 2 is a flow chart for describing a method for processing an image using an apparatus for processing an image mounted in a vehicle according to an exemplary embodiment of the present disclosure. FIG. 3 is an exemplified diagram of a display for describing an extraction of an image processing region according to an exemplary embodiment of the present disclosure.

Referring to FIGS. 1 to 3, in step S11, the controller 150 controls the camera 110 to acquire the image data around the vehicle. In step S13, the controller 150 analyzes the acquired image data. In step S15, the controller 150 extracts the light region from the analyzed image data. In this case, the controller 150 may convert the brightness values of the pixels included in the image data into the binary notation of 0 and 1 and performs the clustering processing on bright pixels to extract the light region from the image data. The light region may include the point source which is the region of the headlight and the taillight of the other vehicle and the reflected light which is the region generated by reflecting the light from the headlight and the taillight of the other vehicle from the road surface.

In step S17, the controller 150 compares the extracted light region with the pre-stored elliptical data in the storage 140. In step S19, the controller 150 confirms whether the light region having the size larger than that of the pre-stored elliptical data exists. As the confirmed result in the step S19, when, among the light regions extracted from the image data, the light region having the size larger than that of the pre-stored elliptical data is absent, the controller 150 proceeds to step S37 to output the image data. To the contrary, as the confirmed result in the step S19, when, among the light region extracted from the image data, the light region having the size larger than that of the pre-stored elliptical data is present, the controller 150 proceeds to step S21. As illustrated in FIG. 3, the reflected light is observed by reflecting light (reference numeral 301) from the point source including the headlight, the taillight, or the like from the road surface, the wall surface, or the like, and therefore is generated as light having the elliptical shape (reference numeral 302). Further, the elliptical data may be formed from the light having the elliptical shape which is observed by analyzing the image data acquired by the camera 110 as described above.

In step S21, the controller 150 separates the light region having the size larger than that of the pre-stored elliptical data into the reflected light. In step S23, the controller 150 calculates the lengths of the major axis and the minor axis of the light region which is separated and calculates the ratio between the calculated lengths of the major axis and the minor axis. As the calculated result, in step S25, the controller 150 proceeds to step S29 when the ratio between the lengths of the major axis and the minor axis is equal to or more than the threshold value and proceeds to step S27 when the ratio between the lengths of the major axis and the minor axis is less than the threshold value. In the step S27, the controller 150 confirms whether the length of the major axis is equal to or more than the threshold length. As the confirmed result in the step S27, when the length of the major axis is equal to or more than the threshold length, the controller 150 proceeds to step S29, and when the length of the major axis is less than the threshold length, the controller 150 proceeds to the step S37. In the step S37, the controller 150 determines that the reflected light is not present within the image data to transfer the image data acquired in the step S11 to a driver through the output 130.

Next, in the step S29, the controller 150 recognizes, as the reflected light, the light region in which the ratio between the lengths of the major axis and the minor axis is equal to or more than the threshold value or the length of the major axis is equal to or more than the threshold length, among the separated light regions. In step S31, the controller 150 confirms the brightness of the road surface from the acquired image data and compares the confirmed brightness of the road surface with the brightness of the light region recognized as the reflected light. In step S33, the controller 150 removes the reflected light from the image data and in step S35, the controller 150 recovers the image data of the region from which the reflected light is removed. In this case, the controller 150 may recover the image data so that the brightness of the region in which the reflected light exists is similar to that of the road surface.

The controller 150 proceeds to the step S37 to output the image data through the output 130. As described above, the present disclosure prevents the driver's dazzling due to the reflected light to be able to improve the driver's visibility at the time of parking and easily confirms vehicles approaching from behind, a lane, objects around the vehicle, and the like to prevent an accident.

As set forth above, the reflected light generated due to the headlight and the taillight of the other vehicle is extracted from the acquired image data around the vehicle, and the reflected light is removed from the image data by processing the image of the region corresponding to the location of the extracted reflected light to maintain the driver's visibility for the other vehicle and minimize the driver's dazzling phenomenon due to the reflected light, thereby minimizing the risk of the accident.

Thus far, the apparatus and the method for processing an image mounted in a vehicle according to the present disclosure have been described. Although the detailed description and the accompanying drawings have been described with respect to the exemplary embodiments and specific terms have been used, these are merely used for the purpose of easily describing the present disclosure but not used for limiting the scope of the present disclosure. It is obvious to those skilled in the art that various modifications may be made without departing from the scope of the present disclosure, other than the exemplary embodiments described herein.

What is claimed is:

1. An apparatus for processing an image mounted in a vehicle, comprising:
   a camera mounted in the vehicle to acquire image data around the vehicle; and
   a controller configured to analyze the image data to extract at least one light region having an elliptical shape or a closed surface shape formed of a free curve and separate the light region into a point source and reflected light and then correct and output the image data of a location at which the reflected light is confirmed, wherein the controller removes the reflected light from the image data and corrects brightness of a region, from which the reflected light is removed, to be the same as that of a road surface confirmed by the image data.

2. The apparatus according to claim 1, further comprising:
   a storage configured to store elliptical data or closed surface data for separating the reflected light.

3. The apparatus according to claim 2, wherein the controller compares the stored elliptical data or closed surface data with the light region to separate the light region having a size larger than that of the elliptical data or the closed surface data into the reflected light.

4. The apparatus according to claim 3, wherein the controller recognizes the light region as the reflected light when a ratio between lengths of a major axis and a minor axis of the separated reflected light is equal to or more than a threshold value or the length of the major axis is equal to or more than a threshold length.

5. The apparatus according to claim 1, wherein the point source is a light source region including a headlight and a taillight of another vehicle.

6. The apparatus according to claim 1, wherein the reflected light is a road surface reflecting region in which light generated from a light source including a headlight and a taillight of another vehicle is reflected from the road surface.

7. A method for processing an image, comprising steps of:
   acquiring, by a controller, image data around a vehicle from a camera;
   analyzing the acquired image data to extract at least one light region having an elliptical shape or having a closed surface shape formed of a free curve;
   separating the light region into a point source and reflected light;
   correcting the image data of a location at which the separated reflected light is confirmed;
   deleting the separated reflected light from the image data;
   confirming the brightness of a road surface from the image data;
   correcting brightness of the region, from which the reflected light is deleted, to be the same as that of the road surface; and
   outputting the corrected image data.

8. The method according to claim 7, wherein in the step of separating the light region into the point source and the reflected light, the light region compares with a pre-stored elliptical data or a closed surface data to separate the light region having a size larger than that of the elliptical data or the closed surface data into the reflected light and separate another light region into the point source.

9. The method according to claim 8, after the step of separating the light region into the point source and the reflected light, further comprising steps of:
- confirming a ratio between lengths of a major axis and a minor axis of the separated reflected light; and
- recognizing the light region as the reflected light when the ratio between the lengths is equal to or more than a threshold value or when the length of the major axis is equal to or more than a threshold length.

* * * * *